United States Patent
Dommermuth et al.

(10) Patent No.: US 10,946,487 B2
(45) Date of Patent: Mar. 16, 2021

(54) METHOD FOR PRODUCING A TURBOMACHINE IMPELLER

(71) Applicant: MAN Energy Solutions SE, Augsburg (DE)

(72) Inventors: Matthias Dommermuth, Zürich (CH); Sascha Schob, Lupsingen (CH)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 16/345,532

(22) PCT Filed: Oct. 26, 2017

(86) PCT No.: PCT/EP2017/077510
§ 371 (c)(1),
(2) Date: Apr. 26, 2019

(87) PCT Pub. No.: WO2018/078048
PCT Pub. Date: May 3, 2018

(65) Prior Publication Data
US 2019/0308285 A1    Oct. 10, 2019

(30) Foreign Application Priority Data
Oct. 27, 2016 (DE) .......................... 102016120480.3

(51) Int. Cl.
*B23P 15/00* (2006.01)
*B22F 3/10* (2006.01)
(Continued)

(52) U.S. Cl.
CPC .......... *B23P 15/006* (2013.01); *B22F 3/1055* (2013.01); *B22F 5/009* (2013.01);
(Continued)

(58) Field of Classification Search
CPC ...... B23P 15/006; B22F 3/1055; B22F 5/009; B22F 7/08; B22F 2998/10;
(Continued)

(56) References Cited

U.S. PATENT DOCUMENTS

| 4,273,512 A | 6/1981 | Weiler |
| 5,038,014 A | 8/1991 | Pratt et al. |

(Continued)

FOREIGN PATENT DOCUMENTS

| CN | 1273895 | 11/2000 |
| CN | 1896465 | 1/2007 |

(Continued)

OTHER PUBLICATIONS

EP 2669042 English Machine Translation; Adam et al.; Method for manufacturing e.g. Stator of pump by cutting device; pp. 1-7 (Year: 2020).*

(Continued)

*Primary Examiner* — Bayan Salone
(74) *Attorney, Agent, or Firm* — Cozen O'Connor

(57) ABSTRACT

A method for producing a turbomachine impeller, which has a radially inner hub body, a radially outer shroud body and blades extending between the hub body and the shroud body. The blades, the hub body and the shroud body are designed as an integral, monolithic assembly includes providing a blank; milling the blank to form a basic contour of the hub body, the shroud body, and the blades; performing build-up welding or additive manufacturing at least once on the main contour that is formed and subsequently performing milling at least once on portions that are formed by the build-up welding.

11 Claims, 1 Drawing Sheet

(51) Int. Cl.
| | |
|---|---|
| *B22F 5/00* | (2006.01) |
| *B22F 7/08* | (2006.01) |
| *B23K 26/60* | (2014.01) |
| *B23K 26/34* | (2014.01) |
| *F04D 29/02* | (2006.01) |
| *F04D 29/22* | (2006.01) |
| *F04D 29/28* | (2006.01) |
| *B22F 3/105* | (2006.01) |
| *B23K 101/00* | (2006.01) |

(52) U.S. Cl.
CPC .............. *B22F 7/08* (2013.01); *B22F 2998/10* (2013.01); *B23K 26/34* (2013.01); *B23K 26/60* (2015.10); *B23K 2101/001* (2018.08); *F04D 29/023* (2013.01); *F04D 29/2222* (2013.01); *F04D 29/284* (2013.01); *F05D 2230/22* (2013.01); *F05D 2230/31* (2013.01)

(58) Field of Classification Search
CPC .............. B22F 2003/247; B23K 26/60; B23K 2101/001; B23K 26/34; F04D 29/023; F04D 29/2222; F04D 29/284; F05D 2230/22; F05D 2230/31
See application file for complete search history.

(56) References Cited

U.S. PATENT DOCUMENTS

| | | | |
|---|---|---|---|
| 5,236,807 A | 8/1993 | Inoue et al. | |
| 6,167,958 B1 | 1/2001 | Lynde | |
| 9,174,426 B1 * | 11/2015 | Dowd | B23P 15/006 |
| 9,868,155 B2 * | 1/2018 | Gerber | B22F 5/009 |
| 9,903,207 B2 * | 2/2018 | Tozzi | F04D 29/023 |
| 10,065,241 B2 * | 9/2018 | Dods | B33Y 30/00 |
| 2011/0208304 A1 * | 8/2011 | Justin | C23C 26/02 |
| | | | 623/11.11 |
| 2015/0017001 A1 | 1/2015 | Ahn | |
| 2015/0177158 A1 * | 6/2015 | Cheverton | B29C 64/393 |
| | | | 700/119 |
| 2015/0267543 A1 * | 9/2015 | Gerber | F04D 29/023 |
| | | | 416/212 R |
| 2016/0010469 A1 | 1/2016 | Guo | |
| 2016/0102682 A1 * | 4/2016 | Gass | B22F 5/106 |
| | | | 417/179 |
| 2017/0136540 A1 * | 5/2017 | Dods | C23C 24/04 |

FOREIGN PATENT DOCUMENTS

| | | | |
|---|---|---|---|
| CN | 1970216 | 5/2007 | |
| CN | 101254578 | 9/2008 | |
| CN | 101549452 | 10/2009 | |
| CN | 101821480 | 9/2010 | |
| CN | 102052094 | 5/2011 | |
| CN | 102548262 | 7/2012 | |
| CN | 103009007 | 4/2013 | |
| CN | 103375356 | 10/2013 | |
| CN | 103402691 | 11/2013 | |
| CN | 105275865 | 1/2016 | |
| CN | 107443010 | 12/2017 | |
| DE | 102010025637 | 1/2012 | |
| DE | 102014012480 B4 | 6/2016 | |
| DE | 102016003701 | 8/2016 | |
| EP | 2 022 987 | 2/2009 | |
| EP | 2669042 | * 4/2013 | ............ B23P 15/00 |
| EP | 2 669 042 | 12/2013 | |
| EP | 3 251 787 | 12/2017 | |
| JP | H 02-251839 | 10/1990 | |
| JP | 2015-510979 | 4/2015 | |
| KR | 1999-0084559 | 12/1999 | |
| WO | WO 2013/124314 | 8/2013 | |
| WO | WO 2014/074379 | 5/2014 | |
| WO | WO 2014/160695 | 10/2014 | |
| WO | WO 2015/181080 | 12/2015 | |
| WO | WO 2016/149774 | 9/2016 | |
| WO | WO 2017/170731 | 10/2017 | |

OTHER PUBLICATIONS

Office Action dated Sep. 3, 2019 issued in Canadian Patent Application No. 3,034,572.
Office Action dated Jan. 14, 2020 issued in Japanese Patent Application No. 2019-511646.
Office Action dated Jun. 22, 2020 issued India Patent Application No. 201947015822.
Office Action dated Jun. 8, 2020 issued Korean Patent Application No. 10-2019-7008209.
Office Action dated Jun. 22, 2020 issued Chinese Patent Application No. 201780066846.7.

\* cited by examiner

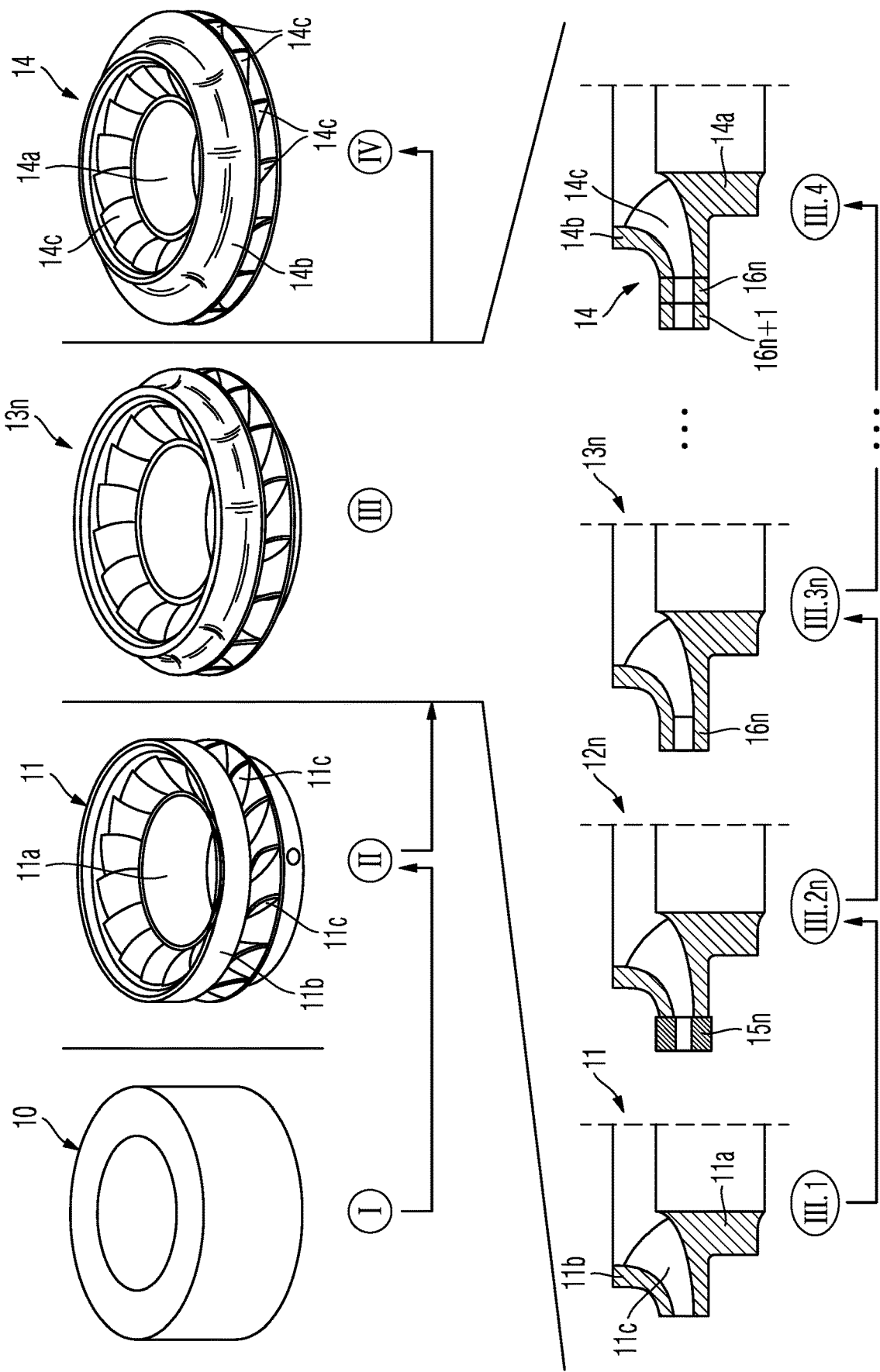

METHOD FOR PRODUCING A TURBOMACHINE IMPELLER

CROSS REFERENCE TO RELATED APPLICATIONS

This is a U.S. national stage of application No. PCT/EP2017/077510, filed on Oct. 26, 2017. Priority is claimed on German Application No. DE102016120480.3, filed Oct. 27, 2016, the content of which is incorporated here by reference.

BACKGROUND OF THE INVENTION

1. Field of the Invention

The invention relates to a method for producing a turbomachine impeller comprising a radially inner hub body, a radially outer shroud body and moving blades extending between the hub body and the shroud body, wherein the moving blades, the hub body and the shroud body are embodied as an integral, monolithic assembly. A turbomachine impeller with a shroud body is also referred to as a closed turbomachine rotor.

2. Description of the Prior Art

To produce a closed turbomachine rotor embodied as an integral, monolithic assembly it is known from practice to provide a blank and mill the turbomachine rotor out of the blank, namely on a milling machine. Typically, 5-axis milling machines are employed to provide the desired three-dimensional contour of the turbomachine impeller in the region of its hub body, its shroud body and its moving blades. During such milling, the accessibility of a blank to be machined is limited, so that any desired three-dimensional contours cannot be made available on the turbomachine impeller. For this reason, there have been considerable design limitations up to now with regard to such closed turbomachine rotors, which are embodied as an integral, monolithic assembly.

SUMMARY OF THE INVENTION

There is a need for producing a closed turbomachine rotor with a radially inner hub body, a radially outer shroud body and the moving blades, which is embodied as an integral, monolithic assembly, with greater design possibilities regarding its three-dimensional contour, namely simply within a short time in order to keep production costs and production times as low as possible.

One aspect of the invention is a new type of method for producing a turbomachine impeller. The method according to one aspect of the invention comprises at least the following steps: providing a blank; milling-machining of the blank forming a basic contour of the hub body, of the shroud body and of the moving blades; at least one-off deposition welding on the formed basic contour and at least one-off subsequent milling-machining on portions formed by the deposition welding. With the method according to the invention, at least one-off deposition welding and subsequently at least one-off renewed milling-machining is carried out following the milling-machining of the blank. The deposition welding can also be replaced by an additive manufacturing method, for example by selective laser sintering. By way of this, three-dimensional contours can then be provided which during the milling of the blank as such cannot be formed as a consequence of restricted accessibilities. The production method is simple and cost-effective. Turbomachine rotors can thus be provided with low production costs and short production times, namely as integral, monolithic assembly with a three-dimensional shaping which could not be produced to date.

According to a further development, deposition welding and subsequently milling-machining is initially alternatingly carried out multiple times on the portions formed by the deposition welding. Preferentially, during an n-th deposition welding, material is deposited on the basic contour, following this n-th deposition welding, the portions formed in the process undergo an n-th milling-machining, following this n-th milling-machining, material is deposited on the basic contour on the portions formed by this milling-machining during an (n+1)-th deposition welding, and following this (n+1)-th deposition welding, the portions formed in the process undergo an (n+1)-th milling-machining, wherein n>1 applies. In this way, particularly advantageous three-dimensional contours can be produced on the turbomachine rotor within short production times with low production costs.

According to an advantageous further development of the invention, the milling-machining of the blank, the at least one-off deposition welding and the at least one-off subsequent milling-machining is carried out on one and the same machine tool, which comprises both at least one tool for the milling-machining and also at least one tool for the deposition welding. This is particularly preferred for providing short production times. Re-clamping of the tool or blank on the machine tool is not required.

According to an advantageous further development of the invention, a metal alloy material is deposited on the blank during the at least one-off deposition welding, which deviates from the metal alloy material of the blank. By way of this, turbomachine impellers can be produced which on the portions formed by deposition welding have particularly advantageous material properties. The blank can also have a certain core/shell structure, e.g. solid core and corrosion-resistant shell.

According to an advantageous further development of the invention, a metal alloy material is deposited on the blank during the multiple deposition weldings, which at least once deviates from the metal alloy material of the blank, wherein during the multiple deposition welding preferentially different alloy materials are deposited on the blank. This further development of the invention serves for providing a turbomachine impeller with material properties that have been adjusted in a defined manner on the portions formed by deposition welding.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

The FIGURE is a highly schematised flow diagram for explaining a method for producing a turbomachine impeller according to one aspect of the invention.

The invention relates to a method for producing a turbomachine impeller comprising a radially inner hub body, a radially outer shroud body and moving blades extending between the hub body and the shroud body. A turbomachine impeller that comprises both an inner hub body and also an outer shroud body is referred to as closed turbomachine rotor. In the case of the closed turbomachine rotor to be produced according to the invention, the moving blades, the hub body and the shroud body are embodied as an integral, monolithic assembly. The hub body is also referred to as hub disc and the shroud body also as shroud disc.

The method for producing a turbomachine impeller is described in the following making reference to the FIGURE, wherein the schematised flow diagram of the FIGURE with the states I, II and III depicts the fundamental method steps of the method according to one aspect of the invention. Method step III is subdivided according to the FIGURE into multiple method steps III.1, III.2$n$, III.3$n$ as well as III.4. The finished turbomachine rotor according to step IV is present at the end of the method according to the invention.

The FIGURE depicts the production of a radial compressor impeller, i.e. of a compressor impeller that is subjected to axial inflow and radial outflow. Although the production of such a radial compressor impeller is preferred, other turbomachine rotors, such as for example turbine rotors, can also be produced with the method according to the invention.

In the method step I, a blank 10 is initially provided. This blank 10 is a ring or a disc consisting of a metallic material, in particular of a metal alloy material. Theoretically, the disc can also consist of a plastic which is then subjected to the milling-machining.

In the following method step II, the blank 10 undergoes a milling-machining, namely subject to forming a basic contour of the radially inner hub body 11$a$, of the radially outer shroud body 11$b$ and the moving blades 11$c$ extending between the radially inner hub body 11$a$ and the radially outer shroud body 11$b$. Here, the milling-machined blank 11 is formed with these basic contours 11$a$, 11$b$, 11$c$.

Following this milling-machining of the blank 10, a milling-machined blank 11 is thus present, which in the region of its hub body 11$a$ to be formed, its shroud body 11$b$ to be formed, its moving blades 11$c$ to be formed has a respective basic contour which can be produced on the machine or milling machine by milling the blank 10 in the presence of the limited spatial accessibility of the blank 10.

The method step II is followed by the method step III. During the method step III, an at least one-off or single deposition welding takes place in the radial direction of the turbomachine impeller on the formed basic contour 11$a$, 11$b$, 11$c$ and at least one-off or at least single subsequent milling-machining on the portions formed by the deposition welding.

The deposition welding and the subsequent milling-machining on the portions formed by the deposition welding is preferentially carried out in the method step III multiple times alternatingly in succession.

Here, during an n-th deposition welding, material is deposited on the basic contour of the milling-machined blank 11, following this n-th deposition welding, the portions 15$n$ formed in the process undergo an n-th milling-machining, following this n-th milling-machining on the portions 16$n$ formed by this milling-machining, material is again deposited on the portions 16$n$ previously milling-machined during an (n+1)-th deposition welding, and following this (n+1)-th deposition welding, the portions 15$n$+1 formed in the process undergo an (n+1)-th milling-machining subject to forming the portions 16$n$+1, wherein n is a whole number greater than 1.

In the FIGURE, the method step III is subdivided into the method steps III.1, III.2$n$, III.3$n$ and III.4. In the method step III.1, the blank 11 provided in the method step II, formed by milling-machining of the blank 10 is present in its basic contour 11$a$, 11$b$, 11$c$. In the method step III.2$n$, deposition welding is carried out, namely in the FIGURE from radially inside to radially outside subject to depositing material on the basic contour 11$b$, 11$c$ of the machined blank 11, and namely according to the FIGURE subject to forming the deposition-welded portions 15$n$. Following the step III.2$n$, the downstream milling-machining of the portions 15$n$ formed by the deposition welding takes place in the step III.3$n$ subject to forming the portions 16$n$. In a following step III.2.$n$+1, deposition welding again takes place in the region of these portions 16$n$ and in a following step III.3$n$+1, a milling-machining of these portions 15$n$+1 formed by the deposition welding subject to forming the portions 16$n$+1 shown in III.4. As already explained, n is a whole number greater than 1. The deposition-welded and milling-machined portions 16$n$, 16$n$+1 extend radially outside both to the shroud body 14$b$ and also the moving blades 14$c$. In the step III.4, the turbomachine impeller 14 is then present with its desired, three-dimensional contour in the region of the hub body 14$a$, of the shroud body 14$b$ and of the moving blades 14$c$.

In the FIGURE, the multiple deposition welding in the radial direction takes place from radially inside to radially outside. It is also possible that this multiple deposition welding is carried out from radially outside to radially inside. Furthermore, the deposition welding alternating with the milling-machining can be carried out both combined from radially outside to radially inside as well as from radially inside to radially outside.

The method steps II and III, i.e. the milling-machining of the blank in the method step II and the at least one-off deposition welding and the at least one-off following milling-machining in the method step III can be carried out on one and the same machine tool, which comprises both at least one tool for the milling-machining and also at least one tool for the deposition welding. The machine tool is preferentially a 5-axis machine tool with a zero-point clamping system, on which the blank 10 is clamped and in the clamped relative position is subsequently in step II milling-machined and subsequently in the step III subjected to a deposition welding and following milling-machining subject to forming final turbomachine impeller 14 in its three-dimensional contour. The deposition welding is preferentially a laser deposition welding.

During the at least one-off deposition welding, a metal alloy material can be deposited on the milling-machined blank 11, which deviates from the metal alloy material of the blank 10. In particular when the deposition welding is carried out multiple times, a metal alloy material deviating from the metal alloy material of the blank 10 can be deposited on the milling-machined blank 11 at least once, and during the multiple deposition welding, different metal alloy materials can be deposited on the milling-machined blank 11 in each case. By way of this, turbomachine impellers 14 can be formed which have material properties adjusted in a defined manner in the region of the portions 16$n$, 16$n$+1 formed, by the deposition welding.

It is pointed out that the laser deposition welding can additionally or alternatively also take place in the axial direction.

With the method according to the invention, closed turbomachine rotors embodied as monolithic assembly, in the case of which shroud bodies, hub bodies and moving blades are embodied in one piece or integrally, can be produced subject to low production costs and subject to short production times with three-dimensional contours which could not be made available to date.

Optionally, the turbomachine impeller 14 produced by the method according to the invention is subsequently subjected to a surface treatment such as for example a coating or the like. A heat treatment process or other downstream-processes are also suitable for this.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for producing a turbomachine impeller, having a radially inner hub body, a radially outer shroud body, and moving blades extending between the inner hub body and the outer shroud body, wherein the moving blades, the inner hub body and the outer shroud body are embodied as an integral, monolithic assembly, the method comprising:
   providing a blank;
   milling-machining the blank to forming a basic contour of the inner hub body, the outer shroud body, and the moving blades;
   at least one deposition welding or additive manufacturing on the basic contour; and
   at least one subsequent milling-machining on portions formed by the at least one deposition welding or additive manufacturing.

2. The method according to claim 1, wherein, alternating multiple times, the deposition welding or the additive manufacturing and the at least one subsequent milling-machining are initially carried out on the portions formed by deposition welding.

3. The method according to claim 2, further comprising:
   during an n-th deposition welding or additive manufacturing, material is deposited on the basic contour;
   following the n-th deposition welding or additive manufacturing the portions formed in the process undergo an n-th milling-machining;
   subsequent to the n-th milling-machining on the portions formed by this milling-machining, material is again deposited on the basic contour during a (n+1)-th deposition welding or additive manufacturing; and
   following this (n+1)-th deposition welding or additive manufacturing, the portions (15n+1) formed in the process undergo an (n+1)-th milling-machining, wherein n>1 applies.

4. The method according to claim 2, wherein multiple alternating deposition welding or additive manufacturing and subsequent milling-machining in a radial direction of the turbomachine impeller is performed at least one of:
   radially inside to radially outside and
   radially outside to radially inside.

5. The method according to any one of the claim 1, wherein the milling-machining of the blank, the at least one deposition welding or additive manufacturing, and the at least one subsequent milling-machining are carried out on one machine tool, which comprises both at least one tool for the milling-machining and at least one tool for the deposition welding.

6. The method according to any one of the claim 1, wherein the deposition welding is carried out as laser deposition welding or laser sintering.

7. The method according to any one of the claim 1, wherein during the at least one deposition welding or additive manufacturing a metal alloy material is deposited on the milling-machined blank, that is different that a metal alloy material of the blank.

8. The method according to claim 2, wherein during the multiple deposition welding or additive manufacturing a metal alloy material is deposited on the milling-machined blank, which deviates at least once from a metal alloy material of the blank.

9. The method according to any one of the claim 2, wherein during the multiple deposition welding or additive manufacturing, different metal alloy materials are deposited on the milling-machined blank.

10. The method according to claim 1, wherein the at least one deposition welding or additive manufacturing, is a laser sintering on the basic contour.

11. The method according to claim 1, wherein the at least one deposition welding or additive manufacturing on the basic contour take place in an axial direction.

* * * * *